United States Patent [19]
Massen

[11] Patent Number: 5,809,165
[45] Date of Patent: Sep. 15, 1998

[54] METHOD FOR COLOR CONTROL IN THE PRODUCTION PROCESS

[76] Inventor: Robert Massen, Am Rebberg 29, 78337 Öhningen, Germany

[21] Appl. No.: 525,775
[22] PCT Filed: Mar. 24, 1994
[86] PCT No.: PCT/EP94/00942
§ 371 Date: Sep. 27, 1995
§ 102(e) Date: Sep. 27, 1995
[87] PCT Pub. No.: WO94/23276
PCT Pub. Date: Oct. 13, 1994

[30] Foreign Application Priority Data

Mar. 28, 1993 [DE] Germany .......................... 43 09 802.9

[51] Int. Cl.⁶ ...................................................... G06K 9/00
[52] U.S. Cl. ........................... 382/168; 382/141; 382/162
[58] Field of Search ..................... 382/162, 165, 382/167, 168, 170, 172, 141, 152, 108, 181, 190, 130; 358/518, 520, 522

[56] References Cited

U.S. PATENT DOCUMENTS

| | | | |
|---|---|---|---|
| 4,677,465 | 6/1987 | Alkofer | 358/522 |
| 4,685,071 | 8/1987 | Lee | 364/526 |
| 4,812,904 | 3/1989 | Maring et al. | 358/107 |
| 5,204,911 | 4/1993 | Schwartz et al. | 382/168 |
| 5,222,154 | 6/1993 | Graham et al. | 382/18 |
| 5,278,641 | 1/1994 | Sekizawa et al. | 382/168 |
| 5,307,182 | 4/1994 | Maltz | 358/522 |
| 5,418,895 | 5/1995 | Lee | 382/168 |

FOREIGN PATENT DOCUMENTS

| | | |
|---|---|---|
| 0315938 | 5/1989 | European Pat. Off. . |
| 2848462 | 5/1979 | Germany . |
| 24006410 | 9/1982 | Germany . |
| 3248529 | 10/1986 | Germany . |
| 4023320 | 1/1992 | Germany . |
| 40233329 | 2/1992 | Germany . |

*Primary Examiner*—Leo H. Boudreau
*Assistant Examiner*—Bhavesh Mehta
*Attorney, Agent, or Firm*—Sixbey, Friedman, Leedom & Ferguson; Gerald J. Ferguson, Jr.; Evan R. Smith

[57] ABSTRACT

The colour control of products is carried out with colour sensitive image-forming sensors such as colour matrix, colour line or colour point scanners by calculating from the signals supplied by these sensors one or several multidimensional histograms of the colour vector components both for a reference and for the samples and deriving colour deviation or coincidence measures from the comparison of said histograms. Non-valid spots corresponding to shining spots, shadow areas or uncertain colour values are automatically eliminated before the comparison. This colour control can thus be used even for objects whose surface is not diffuse and is disturbed by other image contents.

34 Claims, 5 Drawing Sheets

METHOD FOR COLOR CONTROL IN THE PRODUCTION PROCESS

BACKGROUND OF THE INVENTION

The present invention relates to a method for color control in the production process in which a sample and a reference of the sample are recorded pixel-by-pixel with the aid of the same arrangement consisting of one or more color sensitive image-forming sensors, in particular color matrix cameras, color line cameras or color sensitive point scanners.

Continuous control and monitoring of color fidelity of products is an important stage in quality assurance. In addition to manual qualitative monitoring of color fidelity by means of a visual comparison of the product colors with control cards or reference samples, there exists a well-developed color measurement technology for the purposes of quantitative determination of the color and/or color deviation of a sample in comparison to a reference.

Essentially, two classes of methods are used:
1. methods based on evaluation of the color spectrum of the product,
2. methods based on measurement of the primary colors of the colored product.

In the case of both methods, the structure of the surface, such as curvature in the space, applied textures, grooves, scratches or similar features, has a disruptive effect on the measurement results. The methods known to the art therefore also require that the color measurement is carried out on an essentially diffusely reflecting and even sample. Uneven spots, shining spots and spots in shadow must be absolutely avoided. It must also be ensured that only the color to be measured and no other color is present in the measurement window of the color measuring device, e.g. colored markings, imprints, labels or similar features. Since numerous products, e.g. extruded plastics for the production of floor coverings, ready lacquered bodywork parts, foodstuffs such as baked products, vegetables, printed products, etc., do not meet these prerequisites, the user must be satisfied with coloring small flat test models along with the products and measuring them later in the laboratory. It is therefore, for example, customary in the production of linoleum flooring to take samples from the extruded and colored floor covering material, to roll this onto flat cardboard surfaces, so that an even and diffuse surface results and to measure this sample in the color laboratory. This procedure is time consuming, manual and not directly part of the process; when the results are available, not inconsiderable batches have possibly already been produced with inadequate color fidelity.

In a method of the above-mentioned type known to the art from the document U.S. Pat. No. 4,812,904, in which a color video camera is used as an image-forming sensor, the color value signals delivered by the color video camera in the recording of the sample and in the recording of the reference are digitised pixel-by-pixel and stored. For the purpose of color control, the stored color vector components of the sample and the reference are statistically compared. This is done, for example, by forming the mean values of the color vector components for the sample and for the reference and determining whether the mean values of the color vector components of the sample deviate by more than a pre-set tolerance threshold from the mean values of the color vector components of the reference. The reduction of the comparison to mean values and to exceeding the pre-set tolerance thresholds results, however, only in a yes/no statement as to whether or not there is color deviation; on the other hand, no measure is obtained for the magnitude of the color deviation.

SUMMARY OF THE INVENTION

It is an object of the present invention to create a method of the kind mentioned at the beginning, which is capable of detecting the color deviation of a product quickly, continuously and to a large extent automatically and providing one or more color deviation measures for the magnitude of color deviation.

This object is solved according to a first embodiment of the invention by the following method steps:

the color values of all pixels or a subset of the pixels in the whole or in individual parts of the image field of the reference of the or each sensor recording the reference are put in the form of one or more multidimensional histograms of the color vector components and stored in this form;

in the same way, the color values of all or a subset of the pixels in the corresponding image field or in the corresponding parts of the image field of the or each sensor recording the sample are put in the form of one or more multidimensional histograms of the color vector components;

from the comparison of the histograms of the sample and the histograms of the reference, one or more color deviation measures are determined for each image field to be controlled or for each part to be controlled of an image field.

A second embodiment of the invention consists in that the color values of all pixels or a subset of the pixels in the whole or individual parts of the image field of the or each sensor are stored during the recording of the sample and during the recording of the reference and that from the comparison of the color vectors of the reference with those of the sample, a scalar and/or vectorial color deviation measure is determined.

BRIEF DESCRIPTION OF THE DRAWINGS

The method will be explained, by way of example, but not restrictively, by means of color control of lacquered automobile bodywork. For this purpose, reference is made to the following illustrations:

FIG. 1 shows the storage of the color vector components of a picture detail of a bodywork component, which contains both shining spots and shadow zones, using the IHS color space;

FIG. 2 shows the frequency histogram of the color vector comp onents, reduced to the components I and H for a more comprehensible presentation and the elimination of shining and shadow zones by generating a threshold value;

FIG. 3 illustrates color control from the deviation of the histogram of the color vector components of the reference from the histogram of the sample, for clarity reduced to the "hue" component;

FIG. 4 illustrates the obtaining of smoothed histograms by jointly incrementing neighboring values;

FIG. 5 illustrates the reduction of the histograms by generating a threshold value to a binary flagging of those color vector components which exceed this threshold.

DETAILED DESCRIPTION OF THE PREFERRED EMBODIMENTS

Figure 1A:
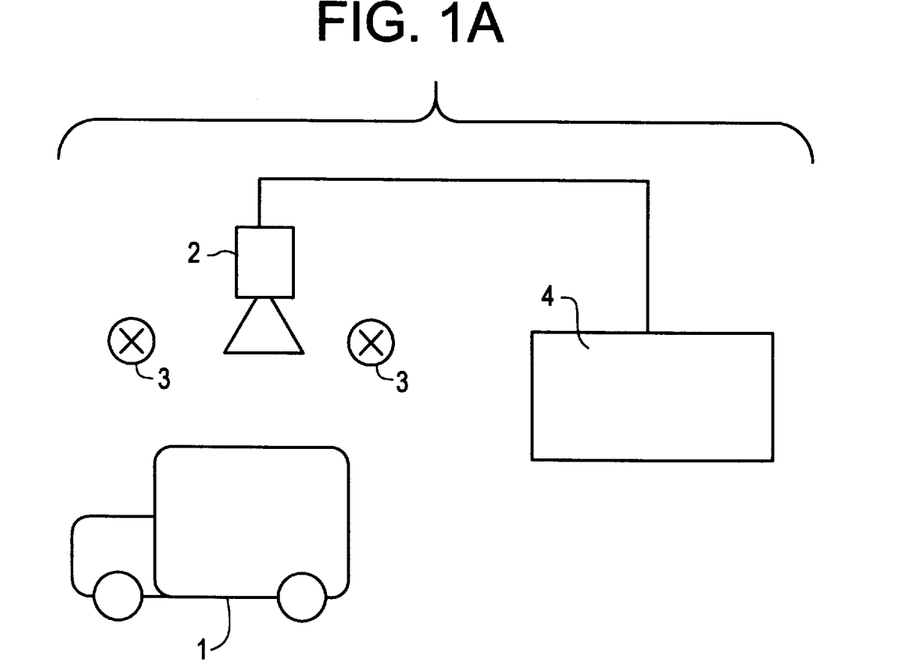
Figure 1B:
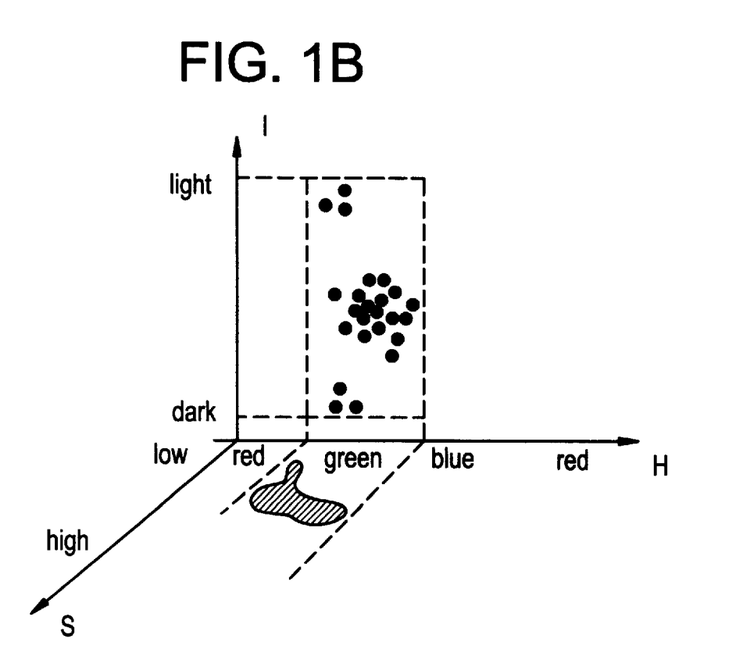

The method is explained in the example of a color control paint shop for automobile bodies. Reference is made to FIG. 1. The body -1- is illuminated by one or more than one illumination devices -3- as evenly as possible and the image recorded by one or more than one color cameras -2-. The electrical signals are transmitted to a computer -4-, in which the method steps are carried out according to the present invention. It is assumed, for example, that the signals from the color camera are present in the IHS color space (I=Intensity; H=Hue; S=Saturation) or are transformed into this color space. This is not a compulsory prerequirement of the inventive idea but simplifies explanation of the underlying principle.

The area recorded by the camera is neither diffuse nor smooth nor even, as is a prerequisite in the color measurement methods known to the art. Thus, shining spots are formed at folding points, or shadow zones arise on pockets, door gaps and door handles. According to the present invention it is not provided that the surface observed is integrally recorded and from this either a set of 3 primary colors (RGB,.Lab, Luv or similar) or a spectrum is determined, but instead a three-dimensional histogram of the color vector components of all pixels in the picture detail recorded by the color camera is formed. Detail -5- demonstrates, for clarification purposes, how the color vectors are distributed in the selected IHS color space.

As a consequence of the unevenly diffuse surface, as a consequence of system noise in the measurement arrangement and as a consequence of the local color fluctuations caused by the process, the measured color vectors spread and form a "cloud" of color vectors in the color space. For better recognition, the projection of this cloud onto the HS plane is hatched. Shining spots and shadow spots can be recognised as outliers from this color cloud: they correspond to color vectors with low saturation and either high intensity (in the case of shining spots) or low intensity (in the case of shadow spots). It is therefore possible by means of a simple threshold value operation to recognise such color vectors automatically and exclude them from the color control. Likewise according to the present invention, outliers can be recognised automatically along the hue axis, e.g. as a consequence of inclusion of an unwanted zone of another color, a marking, a label or similar and excluded from the color control.

This automatic recognition of non-valid areas is possible only by means of the use according to the present invention of image-forming color sensors and is in principle not possible with the currently used color measurement devices which integrate over the measurement field.

Colour control according to the present invention is performed by means of the multidimensional histogram of the color vector components. Whilst in FIG. 1 in detail -5- a number of different color vectors are presented as a cloud of points in the IHS area, it cannot be shown in such a graph how frequently a particular color vector has occurred in the picture detail under consideration. With the customary resolutions of color matrix cameras with 400 000 color picture elements (color pixels) it is naturally a very frequent occurrence that the same color vector is encountered several times. In the case of an ideally pure color and an ideal, noise-free measurement system, the same color vector would have to be encountered 400 000 times and therefore shrink the cloud to a point.

In order to represent the frequency of the IHS components, a 3+1=4-dimensional presentation is required, which can no longer be sketched as a black and white diagram. For the purposes of clarification of the inventive idea, we will therefore present the histograms of the color components not as a 3-dimensional histogram but simplified as a 2-dimensional histogram of the components H and S or as a 1-dimensional histogram of the component H and explain with the aid of this simplified representation.

Figure 2A:
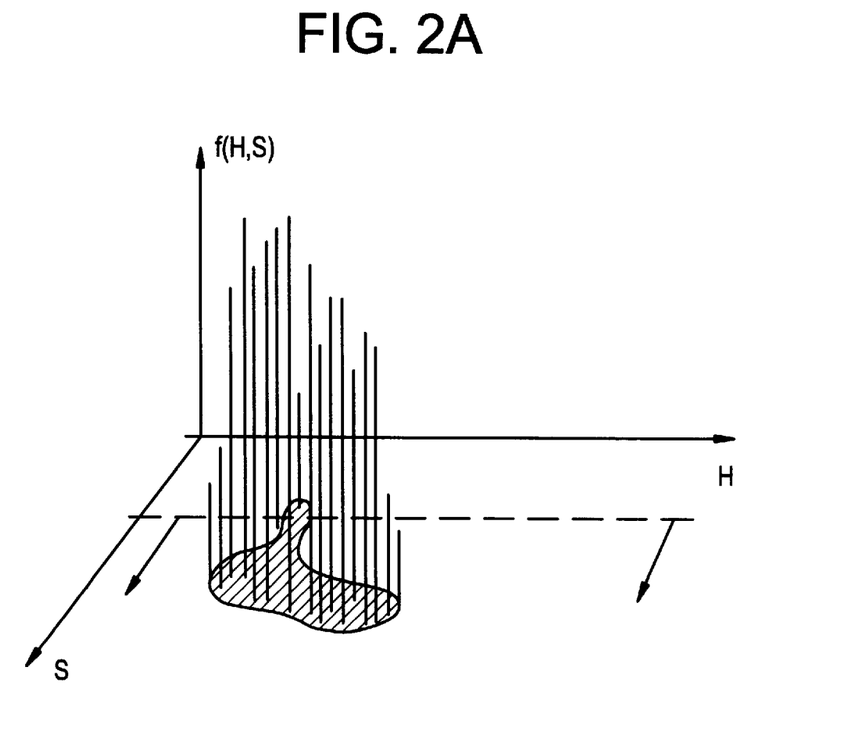
Figure 2B:
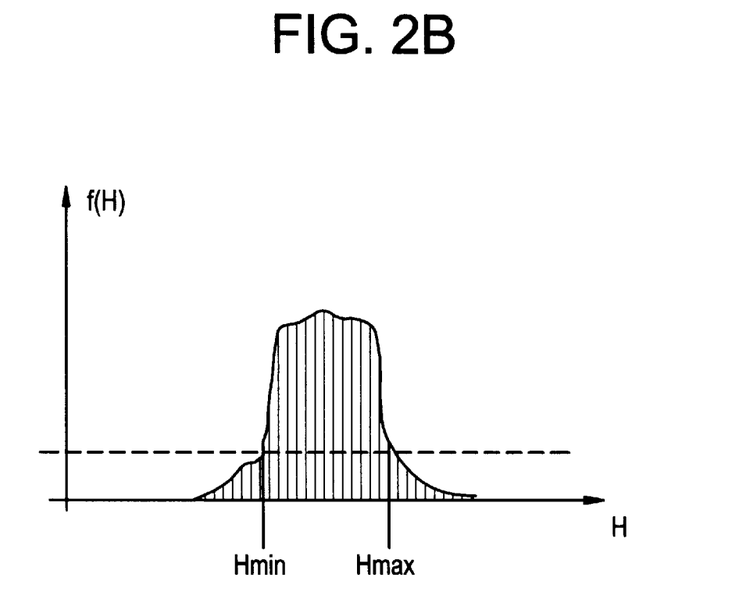

FIG. 2 shows the HS histogram of the example from FIG. 1. f(H,S) here stands for the compound frequency, i.e. the frequency with which a particular value H and a particular value S occur. The detail -1- in FIG. 2 shows this 2-dimensional frequency distribution. It can be recognised from this that certain color components occur significantly more frequently than others. The value range of the H and S values occuring can also be seen.

In a similar way, the three-dimensional histogram f(I,H,S) must be pictured as a presentation of the frequencies with which particular I, H and S combinations occur. Even if such a histogram can no longer be sketched graphically, it can nevertheless be realized in a calculated form as a three-dimensional field.

The recording according to the present invention of the histogram f(I,H,S) of the color pixels recorded in the picture detail under consideration enables, in addition to the consideration of the value range of the I, H and S components occurring, a further practically important automatic sorting of uncertain color measurement values: all color values which occur too rarely can be considered as disturbances and automatically excluded from further control. These are, for example, all color pixels, which are located on the periphery of an area with a uniform color. Colour values on such a "color edge" are always uncertain, since they are found in a transitional area between two colors. By introducing a further threshold -5-, all such color vectors can be masked whose the frequency is too low for them to be considered as a significant color.

The use of an image-forming color sensor with very many color pixels and the production of a multidimensional, generally three dimensional histogram of the color vector components therefore enables automatic masking of:

a) Shining spots and shadow zones of such color vectors, the components of which lie outside a given, permissible value range, b) uncertain color vectors, which occur too rarely, to be considered significant.

Since, by the use of image-forming color cameras, color control, even after masking non-valid and uncertain color values, is still carried out over, in comparison with the traditional color measurement point device, an extremely high number of separate color pixels and as a consequence of the statistics underlying the histogram, despite the relatively poor signal/noise ratio of the individual color pixels, it is still possible to achieve excellently stable histograms.

Figure 3A:
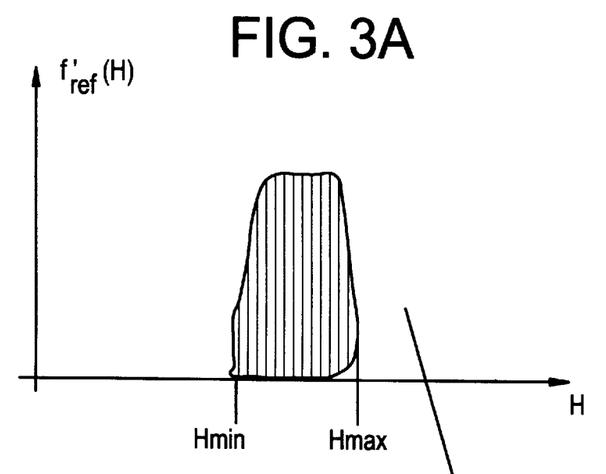
Figures 3B, 3C:
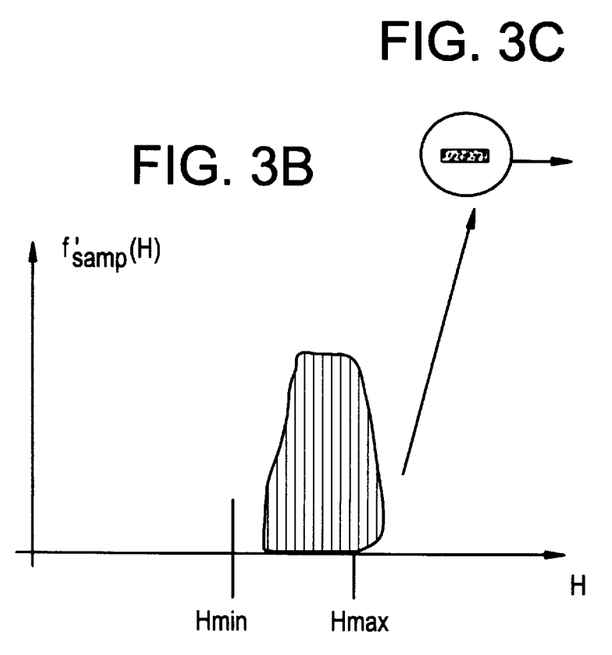
Figure 3D:
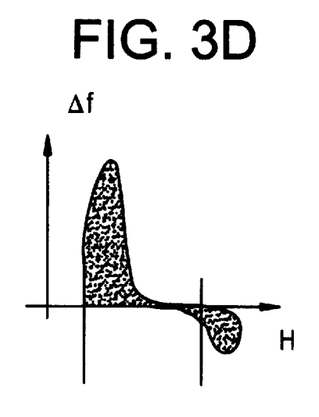

The color control is carried out according to the present invention by comparing the multidimensional histogram $f_{ref}(I,H,S)$ of the reference modified accordingly via the formation of threshold values with the histogram $f_{samp}(I,H,S)$ of the sample as illustrated in FIG. 3.

For a better understanding, we have sketched here only the 1-dimensional histogram f(H). The detail -1- in FIG. 3 shows the graph of the learned histogram of the reference, the detail -2- shows the corresponding histogram of the sample which differs from the reference by a slight shift in the hue to GREEN. The differential Δf of the two histograms is used for example as a comparative measure. This differential function can be condensed to a scalar value, e.g. to the normalized or non-normalized area underneath the graph Δf. It is also reasonable to make other statements condensed to scalar terms, e.g. the position of the center of gravity or higher moments of plane area of the differential histogram Δf.

Besides the pure differential, weighted differentials, differentials of the squares and similar measures of distance may also be used, as are known to an expert in pattern recognition and classification. Comparative measures adapted to the individual task in question can therefore be developed in the same system structure.

FIG. 3 illustrates the inventive idea with the example of the histogram f(H) reduced to a single dimension. Naturally, the differential histogram of the three dimensional histograms $f_{ref}(I,H,S)$ and $f_{samp}(I,H,S)$ is generally formed and a corresponding scalar distance measure obtained from this. These scalar distance measures can indicate the total deviation between the color of the reference and the color of the sample in a normalized percentage scale and present data which is easily understandable even for untrained operating personnel. This measure can obviously also be used electronically as an actuating signal for a quality sort.

It is obvious that instead of distance measure, an output can also be given of the complementary quantity, the coincidence measure, as an indication of color fidelity.

The scalar interval measures do not provide any conclusion as to the type of color shift, as it is given in the traditional color measurement devices as Δf(L,a,b) values.

It is therefore a further inventive idea to condense the three deviation histograms Δf'(I), Δf'(H) and Δf'(S) into one deviation vector Δ(I,H,S), from which the user can determine the form of color deviation. This deviation vector can be converted, with the conversion methods known to the art from color theory, into customary differential measures, e.g. the Δ(L,a,b) values referred to, and displayed. In this way, the values determined with the color control according to the present invention can be presented and interpreted in the usual manner.

The determination of a three dimensional histogram is preferably effected by incrementing a three dimensional accumulation field. Each color pixel from the reference picture detail provides an address pointer after transformation into the IHS color space, which address pointer results from combining the three digitised components of its color vector. This address pointer points to an accumulation field set to zero at the start of the learning phase; each addressed memory cell is incremented. If the individual color vector components are each digitised into 8 bits, this table has a magnitude of $2^{24}*N$ bits, with N>=ld Zmax. Zmax here is the maximum number of possible equal color vectors, i.e. in an image sensor with 400 000 color pixels, this number is 400 000. This kind of accumulation in a three-dimensional field generates the absolute frequency function, which function is converted into a relative frequency function, the actual histogram, by division by the number of pixels used. Despite the generally very numerous color pixels, this three dimensional histogram will contain numerous blanks, because it is very improbable that all IHS combinations actually occur within the color range given.

It is therefore a further inventive idea to close these blanks by means of a three-dimensional smoothing. This occurs according to the present invention by means of a three-dimensional convolution with a likewise three-dimensional filter core which, for example, corresponds to a three-dimensional Gaussian function. Another useful way of closing the blanks involves three-dimensional morphological operations such as dilatation or closing. Both methods are known to the expert in digital image processing and do not need to be explained further. Reference is made for this purpose to the relevant literature, e.g. Haberäcker: Digitale Bildverabeitung [Digital image processing], Hanser Verlag.

Figure 4A:
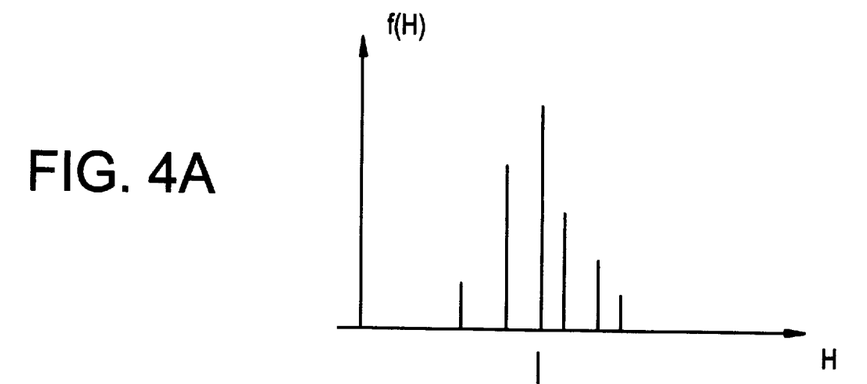
Figure 4B:
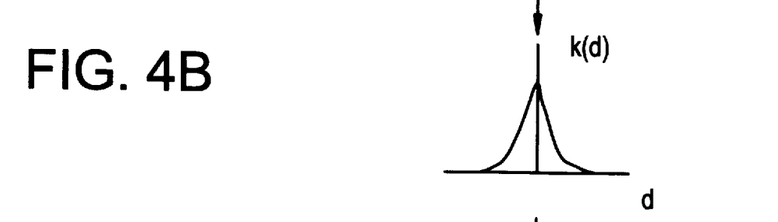
Figure 4C:
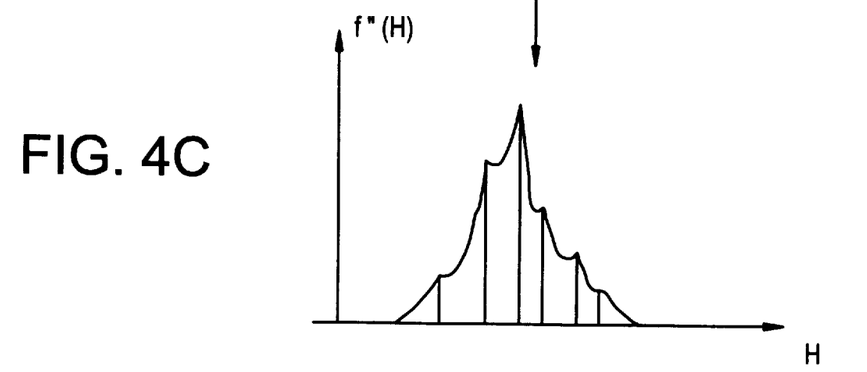

A further inventive idea is to close the only locally occupied histogram by means of a method which corresponds to the human principle of "generalisation". The individual color pixels encountered in the training phase provide color vectors which are taken as representatives of a stochastic process. The remaining blanks, as shown in FIG. 4, detail -1-, are caused purely by chance. The "generalisation" means that the fact that precisely an observed field is occupied in the accumulation field and that the neighboring fields are empty, has no significance in the sense of color deviation, but is based only on the random sample being too small. It is therefore sensible to close the neighboring spots, "neighboring" to be understood in the sense of the geometric, e.g. Euclidean distance of the color vectors. This generalisation is achieved according to the present invention by the fact that not only the memory space addressed by the IHS address pointer is incremented but also its geometric neighbors, however with a decaying proportion with increasing distance. This decay function k(d) -2- ensures that closed histograms -3- result, which no longer possess any random blanks.

It is a further inventive idea that this generalisation function may be different for the three components I,H,S. If it is desired to carry out a color control relatively independently of the intensity I, because e.g. a drift of the intensity is of less importance to the quality than a drift of the hue and of the saturation, a decay function k(d) will be selected, which decays more slowly along the I components than along the H and S components. As a result of this, the histogram is enlarged in the I direction and therefore a drift of the intensity will enter less into the differential histogram Δf than a drift of H and S. The same inventive idea can also be applied to the smoothing and morphological operators, by these operators receiving a correspondingly rotationally asymmetric core.

Figure 5A:
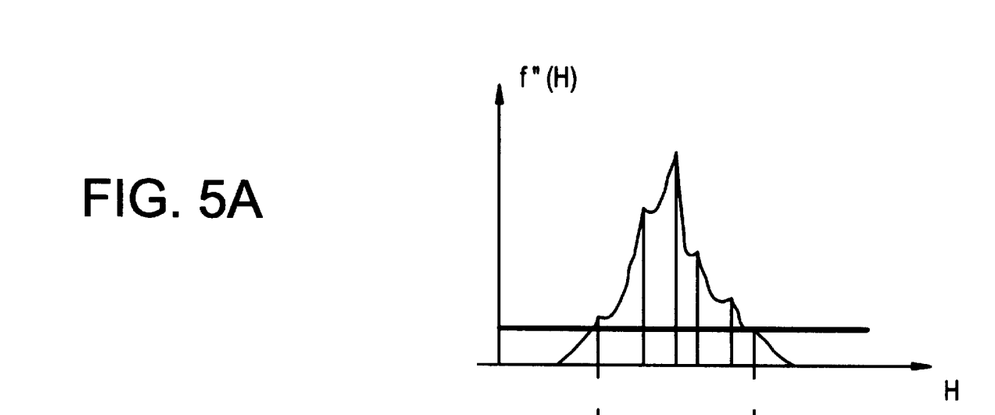
Figure 5B:
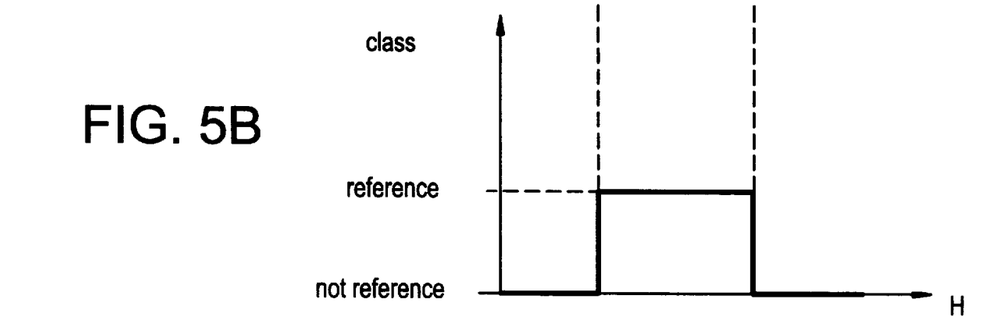

The method for color control according to the present invention can be simplified further by not comparing the entire histograms f'(I,H,S) of the reference and of the sample, but instead binarising these histograms by means of a threshold value operation. FIG. 5 shows how the histogram is compressed to a class affiliation function. All values of the histogram field which exceed the threshold are occupied with a code which contains the information: "This color vector belongs to the learned reference". A binary table results from this both for the reference and the sample. Scalar measures can be determined as a comparative measure of both histograms, such as the number of different storage locations, or vectorial measures such as the number of different storage locations determined separately for each component. These operations are pure counting operations. They can be carried out according to the present invention in video real time, by producing both the table memory and also the corresponding counting mechanism with digital modules such as static memories and counters.

A coincidence measure between the reference and sample using such binarised histograms can be deduced particularly simply, by the color vectors of the relevant pixels of the sample addressing the histogram field of the reference and being read each time, as to whether this memory location is occupied with a flag "belongs to the color reference". The sum of all memory locations read which display this flag is a measure of the color coincidence between the reference and the sample.

It is a further inventive idea not to restrict the learning of the reference to the deduction of the histogram of the pixels of interest. If, for example, undesired parts with a color not relevant for the color control, are to be found in the image field, e.g. labels, markings, stickers, screw holes, etc., these are eliminated by the fact that the pixels of these areas do not increment but decrement the histogram accumulator. It is obviously necessary for this purpose that these areas are either detected automatically (e.g. by means the value range of the color components, or by means of their form and position in the image field with methods of pattern recognition) or that they are marked interactively. By decrementing, the objective is achieved that in the critical peripheral zones between the color space to be controlled and the adjacent irrelevant area a steeper drop in the histogram results and therefore fewer blanks arise in this uncertain area.

In the example of color control of automobile bodywork, the color control according to the present invention is performed with a plurality of color cameras simultaneously, and the taking of the pictures is then advantageously triggered by means of an external trigger device when the parts of interest are in the image field. According to the present invention, these parts can also be found automatically with methods of color processing and pattern recognition known to the art. This is a very important option for measurement in production, since as a rule, the products cannot be guided very precisely past the cameras. This form of automatic determination and follow-up of control zones is not possible with traditional non-image-forming color measurement devices.

The image taking is performed according to the present invention in the case of samples in motion, by means of stroboscopic illumination and/or shortened integration time of the image sensor.

I claim:

1. A method for color control of an image field in a production process in which a sample and a reference of the sample are recorded pixel-by-pixel by means of one or more color sensitive image-forming sensors, comprising the steps of:

forming at least one multidimensional reference histogram of color vector components from color values of at least a subset of the pixels in at least a portion of an image field of each sensor recording the reference, and storing said at least one histogram;

forming at least one multidimensional sample histogram of color vector components from color values of at least a subset of the pixels in the corresponding portion of the image field of each sensor recording the sample; and comparing the sample histogram and the reference histogram to determine at least one color deviation measure for each portion of the image field to be controlled.

2. The method according to claim 1, further comprising the steps of: automatically eliminating at least one of (a) disturbing shining spots, (b) shadow zones, and (c) areas with uncertain color values, by removing areas which have at least one of (a) too little saturation, (b) too strongly deviating intensity, (c) an impermissible area of the hue, and (d) too low a frequency of occurrence, by forming a threshold value in the histogram of the color vector components; and forming a color deviation measure by means of a comparison of the correspondingly modified histograms of the reference with the corresponding histograms of the sample.

3. The method according to claim 2, further comprising the step of: obtaining one or more color deviation measures by forming one or more distance measures between the reference histogram and the sample histogram.

4. The method according to claim 3, wherein the distance measure or measures are scalar measures.

5. The method according to claim 4, further comprising the steps of: forming a differential histogram based on the component-wise formed difference of the reference histogram and the corresponding sample histogram; and determining a scalar distance measure from the geometric parameters of said differential histogram.

6. The method according to claim 5, wherein the geometric parameter is the area which spans the whole differential histogram with the abscissas of its components.

7. The method according to claim 3, wherein the distance measure represents a vectorial measure, of which the components represent the distance of the color vector components of the reference to the corresponding color vector components of the sample.

8. The method according to claim 7, further comprising the steps of: forming a differential histogram from the component-wise formed difference of the histogram of the color vector components of the reference to the corresponding histogram of the sample, and deducing the vectorial distance measure from geometric parameters of the differential histogram.

9. The method according to claim 8, wherein the component-wise determined distance measure is converted into the values conventionally used in colorimetry and displayed.

10. The method according to claim 1, further comprising the steps of: performing a binarisation of the reference and sample histograms by forming a threshold value and by replacing the frequency entered by a binary flag which specifies whether the corresponding frequency lies above or below the threshold; and determining the color deviation measure from the comparison of the binarised histograms of the reference and of the sample.

11. The method according to claim 10, wherein the binarily marked histograms of the color vector components are modified by means of neighborhood operations in such a way that individual unoccupied locations are filled up and disturbance points formed by outliers are removed.

12. The method according to claim 10, wherein the comparison between the reference and the sample is made in such a way that the binarised histogram of the reference is addressed by all color vectors of the pixel of the sample relevant for the color control and a coincidence measure is deduced between the color of the reference and that of the sample from the number of flags read which correspond to the binary flag "threshold value exceeded" or is formed from the number of these flags weighted with the significance number read.

13. The method according to claim 12, wherein those color vectors are considered relevant color vectors of the which lie in a valid value range of the color components.

14. The method according to claim 1, further comprising the steps of: performing a binarisation of the sample and reference histograms by forming a threshold value and by replacing the frequency entered by (a) a flag for frequencies which lie below the threshold, and (b) by a significance figure for frequencies which lie above the threshold; and determining the color deviation measure from the comparison of the sample and reference histograms binarised in this way.

15. The method according to claim 14, wherein the significance figure is deduced from the amount by which the frequency exceeds the threshold.

16. The method according to claim 14, wherein the significance figure is deduced from the value of the Euclidean distance of the color vector in question to the centre of gravity of the cloud formed in the color space from all color vectors recorded.

17. The method according to claim 14, wherein the binarily marked histograms of the color vector components are modified by means of neighborhood operations in such a way that individual unoccupied locations are filled up and disturbance points formed by outliers are removed.

18. The method according to claim 14, wherein the comparison between the reference and the sample is made in such a way that the binarised histogram of the reference is addressed by all color vectors of the pixels of the sample relevant for the color control and a coincidence measure is deduced between the color of the reference and that of the sample from the number of flags read which correspond to the binary flag "threshold value exceeded" or is formed from the number of these flags weighted with the significance number read.

19. The method according to claim 18, wherein those color vectors are considered relevant color vectors of the sample which lie in a valid value range of the color components.

20. The method according to claim 1, wherein the histograms of the color vector components are smoothed before the comparison.

21. The method according to claim 20, wherein the smoothing function for the multidimensional histogram of the color vector components is different for all or some of the color vector components.

22. The method according to claim 20, wherein the histogram of the color vector components is formed by incrementing a multidimensional memory field which is addressed by the color vector components of the reference combined into an address pointer, and when incrementing the addressed storage location, the storage locations are also incremented which are geometric neighbors in the color space, however by a partial amount, which decreases to zero according to a decay function as the distance to these neighbors increases.

23. The method according to claim 22, wherein the decay function is different for each or some of the color vector components of the histogram.

24. The method according to claim 22, wherein those values of the histogram are incremented which belong to color vectors of pixels geometrically neighboring in the controlled image field and those values of the histogram are decremented which belong to color vectors, which belong to pixels recorded by the image-forming sensor, which should not be included in the color control because of another color or a local peculiarity.

25. The method according to claim 1, wherein the purposes of calibrating the whole system, stable color control references are recorded and stored by the color sensor, that continuously or from time to time the stored color values of the color control references are compared with the color values of the color control references taken at present and that correction values are obtained from this comparison for the correction of the color values of all pixels of interest for the color control.

26. The method according to claim 25, wherein the color control references are located constantly in the image field of the sensors.

27. The method according to claim 1, wherein the image field parts of interest for the color control are tracked by calculation in such a way by means of simultaneously recorded flags or object patterns, that they correspond, even in the case of samples positioned imprecisely during image capture, always with the same image field parts determined in the reference.

28. The method according to claim 1, wherein with methods of pattern recognition, the image field parts to be controlled are automatically found in the image field of the sensors and that the color control is restricted to the pixels of these image field parts.

29. An apparatus for performing the method according to claim 1, including an illumination arrangement for illuminating surfaces of the reference and of the sample, an arrangement comprising one or more color sensitive image-forming sensors for pixel-by-pixel recording of said illuminated surfaces and for supplying electrical image signals representing color vector components of the recorded pixels, and a computing unit, which receives digitized signals of the image-forming sensors and performs the individual steps of the method in a program controlled manner.

30. The apparatus of claim 29, wherein the electrical image signals of the image-forming sensors representing the color vector components are digitized and applied as an address to a memory contained in the computing unit, so that during a training phase, a reference is recorded and all addressed storage locations are incremented, all stored values, which exceed a predetermined threshold are provided with a flag, and in a control phase the storage locations addressed by all color vector components of pixels to be controlled are read, and so that with the aid of a counter, the sum of the read flags is formed and this sum is outputted as a measure for the coincidence and/or used as a control signal for a quality sort.

31. The apparatus of claim 29, wherein an arrangement of color control references during the recording of the sample and the reference is simultaneously arranged in the image field of the image-forming sensor or sensors in such a way that it is recorded simultaneously or alternately.

32. The apparatus of claim 29, wherein for the color control of moving parts, at least one of the image-forming sensors and the illumination are operated stroboscopically.

33. The apparatus of claim 29, wherein the image recording in the case of moving samples is triggered by an external sensor when the sample is located in a predetermined position in the image field of the image-forming color sensor.

34. A method for color control of three dimensional objects in a production process, in which a sample and a reference of the sample are recorded pixel-by-pixel by means of one or more color sensitive image-forming sensors, comprising the steps of:

forming at least one multidimensional reference histogram of color vector components from color values of at least a subset of the pixels in at least a portion of an image field of each sensor recording the reference, and storing said at least one histogram;

forming at least one multidimensional sample histogram of color vector components from color values of at least a subset of the pixels in the corresponding portion of the image field of each sensor recording the sample;

comparing said sample histogram and the reference histogram to determine at least one color deviation measure for each portion of the image field to be controlled; and controlling the color of the three dimensional object based on said color deviation measure.

* * * * *